UNITED STATES PATENT OFFICE.

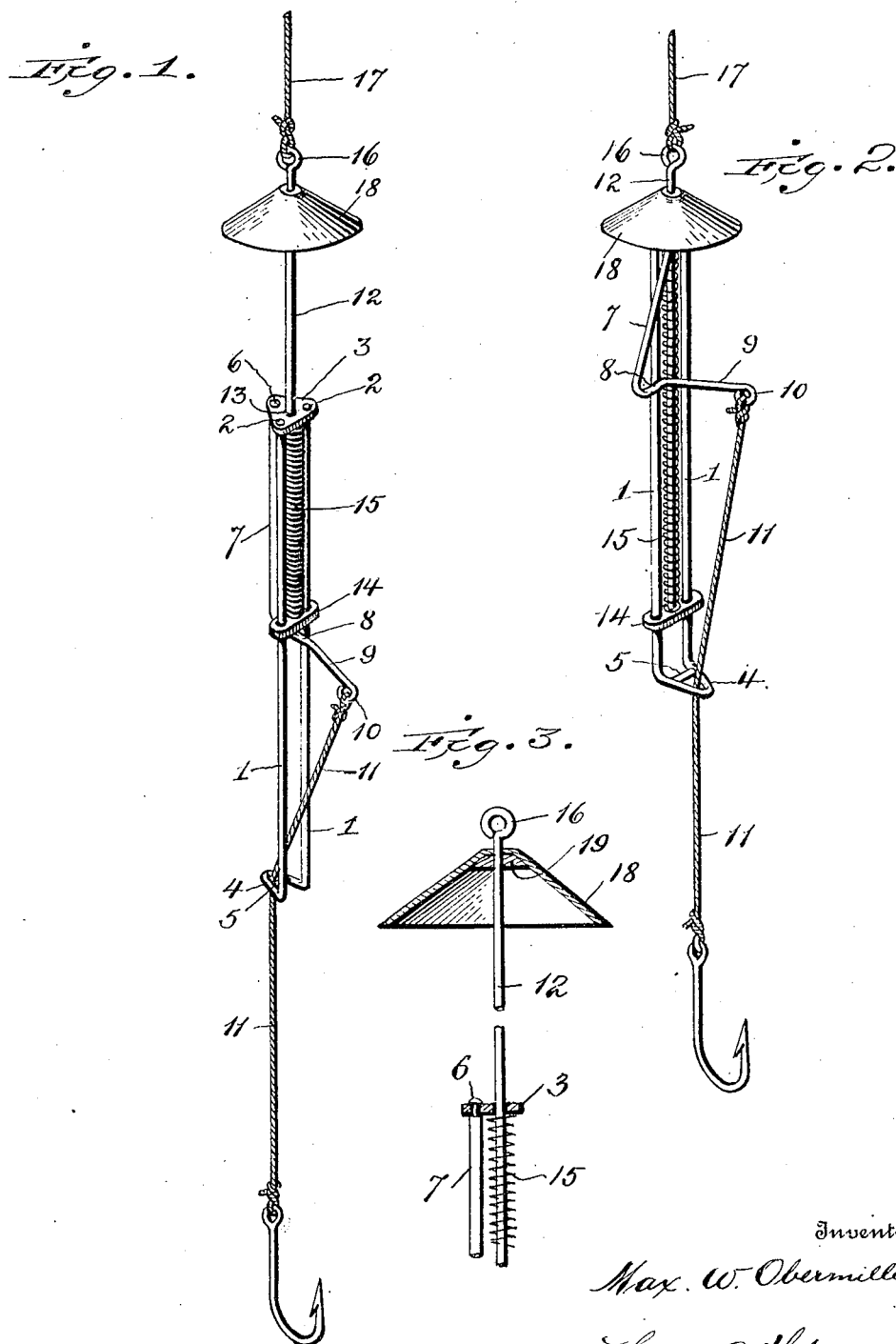

MAX W. OBERMILLER, OF NEW YORK, N. Y., ASSIGNOR TO WOLFRAM STAGER, OF NEW YORK, N. Y.

FISHING-TACKLE.

1,292,860.  Specification of Letters Patent.  Patented Jan. 28, 1919.

Application filed July 25, 1918. Serial No. 246,720.

*To all whom it may concern:*

Be it known that I, MAX W. OBERMILLER, a citizen of the United States of America, residing at New York city, in the county and State of New York, have invented certain new and useful Improvements in Fishing-Tackle; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to fishing tackle, and the object thereof is to provide a device which may be attached to a fishing line to automatically produce a quick pull on the hook as soon as a fish strikes.

The device is preferably attached to the end of the line, and a snood is attached to the device, the snood being given a quick jerk when a fish bites.

My invention is an improvement in the known construction of such devices, and will hereinafter be fully described and claimed.

Referring to the accompanying drawings, in which like parts are similarly designated—

Figure 1 is a perspective view showing the device set.

Fig. 2 is another perspective view, in a different position, showing the device released, and Fig. 3 is a partial section.

My device comprises a wire loop the ends of whose parallel legs 1 are riveted at 2 in a triangular or other shaped plate 3, and the loop end is bent at right angles at 4, to the legs 1, to form a snood guide, there being a short wire 5 connected across the loop to form the eye of the snood guide 4.

Loosely riveted at 6 in the triangular plate 3, so as to be free to swivel, as with a ball and socket joint, is a trigger, comprising a straight portion 7, a curved bent portion 8, acting as the trigger surface, and the inclined arm 9 having a snood eye 10 at the end thereof. The end of the snood 11 is fastened in the eye 10, passes through the snood guide 4, and has a hook connected to its lower end. A rod 12 is slidable through a central hole 13 in the triangular plate 3, and is riveted at its lower end to a guide 14, which guide is provided with two holes through which pass the wires 1, 1.

A coil spring 15 surrounds the wire 12 between the plate 3 and the guide 14. This spring urges the plate 3 and the guide 14 apart when the latter is released.

At the upper end of the rod 12 there is an eye 16 for connecting it to the fishing line 17, and at or near this eye there is preferably, but not necessarily, secured a dished anchor plate 18, here shown as conical, but any other shape of plate may be used if found necessary or desirable.

This plate 18 is secured to the rod 12 by means of solder, as shown at 19.

The operation is as follows:

The spring 15 is compressed by pulling the rod 12 with respect to the wires 1, 1, and the trigger is placed under the guide 14, said guide resting in the curved portion or trigger surface 8, at the bend in the trigger. The trigger is loose and swivels at 6, so that it is perfectly free to swing when it is released. As will be seen from Fig. 1, the inclined arm 9 of the trigger projects from between the wires 1, 1, in a direction opposite that of the snood eye 4. The slightest pull on the hook will cause the trigger to release the guide 14. When free to move the guide 14 rides along the inclined arm 9 and throws the trigger out from between the wires 1, 1, in a sort of camming action, producing a rapid pull or jerk on the snood. At the same time the plate 3 is caused to move relatively to the rod 12, carrying with it the trigger 7 to which the snood is connected, and also carrying with it wires 1, 1. The parts then assume the position shown in Fig. 2.

The snood guide 4 is bent out from wires 1, 1, in order that repeated pulls on the snood, which cause the snood knot at 10 to ride back and forth past the guide 14, shall not cause this knot to wear out; otherwise the guide 4 might be in the plane of the wires 1, 1.

In order to increase the pull produced by the spring on the hook, that is to say, to cause the spring to produce more pull on the snood than on the line, I may place an anchor plate, as 18, on the rod 12, so that when the spring 15 is released the wires 1, 1, will be drawn up toward the plate; this plate by reason of its surface offering a large resistance to the water, holds the rod 12 substantially stationary.

After the fish is hooked the spring 15 operates as a yielding member between the snood and the line and prevents the fish from snapping the line by a sudden jerk. The plate 18 acts as a drag, constantly retarding the efforts of the fish to run, especially with game fish.

I claim—

1. A fishing tackle comprising a rod, a guide secured to the end thereof, a plate through which the rod slides, a loop the ends of which are secured to said plate, a spring on said rod included between said plate and guide, a trigger whose upper end is swiveled in said plate, said trigger having a bend for engaging under the guide to hold the spring compressed, and an inclined portion beyond the bend terminating in a snood attaching eye.

2. A fishing tackle comprising a rod, a guide secured to the end thereof, a plate through which said rod slides, a coil spring around the rod between the plate and guide, a snood guide secured to the plate and passing through said guide, a trigger loosely pivoted to said plate for engaging said guide and having an inclined portion cammed outwardly by said guide when released to produce a pull on a snood attached to said trigger simultaneously with the upward movement of said plate and trigger.

3. A fishing tackle comprising a rod, a guide secured to the end thereof, a plate through which said rod slides, a coil spring around the rod between the plate and guide, a snood guide secured to the plate and passing through said guide, a trigger loosely pivoted to said plate for engaging said guide and having an inclined portion cammed outwardly by said guide when released to produce a pull on a snood attached to said trigger simultaneously with the upward movement of said plate and trigger, and an anchor plate secured to the upper end of said rod for resisting movement through the water.

4. A fishing tackle comprising a rod, a guide secured to the end thereof, a plate through which said rod slides, a coil spring around the rod between said plate and guide, a snood guide comprising a wire loop whose parallel legs are secured at their ends to said plate and slide through perforations in said guide, the end of the loop being bent at an angle to said legs and having an eye, a trigger loosely swiveled in said plate, said trigger comprising a wire having a straight portion, a bend and an inclined cam portion, said inclined portion projecting between said legs under said guide in a direction opposite to that of the snood guide when in operative position.

5. A fishing tackle comprising a rod, a guide secured to the end thereof, a plate through which said rod slides, a coil spring around the rod between said plate and guide, a snood guide comprising a wire loop whose parallel legs are secured at their ends to said plate and slide through perforations in said guide, the end of the loop being bent at an angle to said legs and having an eye, a trigger loosely swiveled in said plate, said trigger comprising a wire having a straight portion a bend and an inclined cam portion, said inclined portion projecting between said legs under said guide in a direction opposite to that of the snood guide when in operative position, and a cupped anchor plate secured to said rod.

In testimony that I claim the foregoing as my invention, I have signed my name hereto.

MAX W. OBERMILLER.

Copies of this patent may be obtained for five cents each, by addressing the "Commissioner of Patents, Washington, D. C."